Patented July 13, 1954

2,683,746

UNITED STATES PATENT OFFICE 2,683,746

CRYSTALLIZABLE COMPLEXES OF TRANS,-TRANS, PENTAENE ALDEHYDES WITH SUBSTITUTED PHENOLS

Charles H. Benton, Jr., and Charles D. Robeson, Rochester, N. Y., assignors to Eastman Kodak Company, Rochester, N. Y., a corporation of New Jersey No Drawing. Application March 5, 1952, Serial No. 275,031

19 Claims. (Cl. 260—598)

This invention relates to crystallizable complexes of trans,trans pentaene aldehydes having the carbon skeleton of vitamin A aldehyde and is particularly concerned with crystallizable complexes of 2,6-trans,trans vitamin A aldehyde.

Vitamin A aldehyde is an active form of vitamin A material and is a useful material for conversion to vitamin A alcohol and vitamin A esters such as the acetate and palmitate which are in common commercial use. Vitamin A aldehyde exists in several isomeric forms. Thus, vitamin A aldehyde exists in the form of geometrical isomers based on the cis or trans configuration around the olefinic double bonds in the 2 and 6 positions as starred in the following formula:

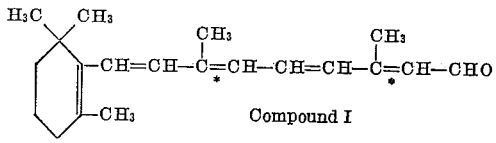

Compound I

The geometrical isomers include 2,6-trans,trans vitamin A aldehyde; 2,6-cis,cis vitamin A aldehyde; 2-trans-6-cis vitamin A aldehyde; and 2-cis-6-trans vitamin A aldehyde. Additionally, vitamin A aldehyde exhibits desmotropic isomerism, the most common desmotropic isomer appearing to have the formula:

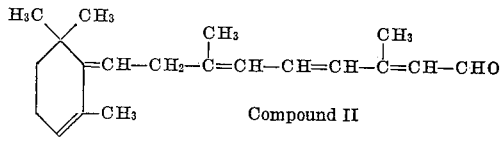

Compound II

The desmotropic isomers such as Compound II are readily isomerized to vitamin A aldehyde (Compound I) by treatment with a base. Of the geometrical isomers, however, the 2,6-trans,-trans form exhibits the highest biological activity and it is therefore desirable to separate the 2,6-trans,trans aldehydes from the cis forms. Because of the closely related properties of the cis and trans forms, however, it is difficult to effect such separations.

It is accordingly an object of this invention to selectively convert the trans,trans pentaenals having the carbon skeleton of vitamin A aldehyde to derivatives which can be readily separated from the cis forms.

It is another object of this invention to provide new crystallizable derivatives of trans,trans pentaenals corresponding to vitamin A aldehyde from which the trans,trans pentaenal can be readily regenerated.

It is a further object of this invention to facilitate the separation of highly active forms of vitamin A aldehyde from closely related isomers having lower biological activity.

Another object of the invention is to provide crystallizable complexes of trans,trans vitamin A aldehyde unmixed with any substantial amount of cis forms of vitamin A aldehyde.

Another object of the invention is to provide selective trans,trans vitamin A aldehyde complexes.

Other objects will be apparent from the description and claims which follow.

These and other objects are attained by means of this invention as described more fully hereinafter with particular reference to preferred embodiments thereof. We have discovered that materials of the formula

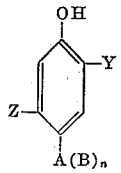

in which A is either oxygen or nitrogen, B is either hydrogen or an alkyl group, $n$ is equal to the valence of A minus one but not greater than two, and Y and Z are hydrogen atoms, halogen atoms or alkyl groups, and at least one of B, Y and Z is not a hydrogen atom, selectively form crystallizable complexes with trans,trans pentaenals having the vitamin A aldehyde carbon skeleton but do not form crystallizable complexes with the isomeric cis forms of such aldehydes such as the cis,cis forms, the cis,trans forms, or the trans,cis forms. Furthermore such materials do not form complexes with the closely related compounds such as vitamin A alcohol.

The exact nature of the complex formed is not known, but the aldehyde is readily regenerated in unchanged form by washing with aqueous alkali or the like and the product thus appears to be a complex rather than a chemically substituted derivative. The complexes are formed in equimolar proportions of the aldehyde and the complexing material. Complexes are formed with the 2,6-trans,trans desmotropic isomer, Compound II, as well as with 2,6-trans,trans vitamin A aldehyde itself, although the complex of Compound II should be formed under acid conditions if it is desired to preclude isomerization to Compound I. Among the suitable complexing materials are the monoalkyl hydroquinones such as 2-methyl hydroquinone or toluhydroquinone, 2-ethyl hydroquinone, 2-t.-amyl hydroquinone and similar monoalkyl hydroquinones; monohalohydroquinones such as 2-chlorohydroquinone, 2-bromohydroquinone and the like; 2,5-dialkyl hydroquinones such as 2,5-dimethyl hydroquinone, 2,5-diethyl hydroquinone, 2,5-di-t. amyl hydroquinone and the like; 2,5-dihalohydroquinones such as 2,5-dichlorohydroquinone; p-alkoxy phenols such as p-methoxy phenol, p-ethoxy phenol, p-butoxy phenol, o-methyl-p-methoxy phenol and the like; and p-dialkylamino phenols such as p-dimethylamino phenol, p-diethylamino phenol, o-methyl-p-dimethylamino phenol and the like.

The complexes are readily formed by adding the complexing material to a solution of the trans,trans pentaenal in an inert organic solvent such as petroleum ether, hexane or similar low boiling petroleum fraction, ethyl ether, methanol, ethanol, benzene or the like or by adding the complexing material directly to a liquid mixture containing the trans,trans pentaenal if the complexing material is soluble in the mixture under the condititons of addition. The complex is formed upon standing at room temperature but slightly elevated temperatures, such as 40–70° C., are desirably used to aid in dissolving the complexing material. The complexes formed in accordance with this invention are then separated from the mixture by any desired method such as crystallization, solvent partition or any well-known separating method. The separation is readily accomplished because the chemical and physical properties of the complex differ greatly from the uncomplexed cis isomers left in the reaction mixture. The complexes embodying the invention are readily crystallizable and have relatively low solubility in inert organic solvents. The separation is thus readily accomplished by cooling and concentrating the reaction mixture to cause fractional crystallization of the complex. With solvents such as petroleum ether, ethyl ether or the like, crystallization occurs readily at room temperature although lower temperatures can, of course, be used if desired. Alternatively, the entire reaction mixture can be dried and the uncomplexed cis isomers leached out of the solid residue with an organic solvent, the cis forms of vitamin A aldehyde being readily soluble in most common organic solvents.

The invention is illustrated by the following examples of certain preferred embodiments thereof, it being understood that the examples are not intended to limit the scope of the invention unless otherwise specifically indicated.

*Example 1*

A 0.2 g. portion of 2,6-trans,trans vitamin A aldehyde and a 0.175 g. portion of di-tertiary amyl hydroquinone were dissolved in ethyl ether, most of the ether was evaporated away by warming the resulting solution, and then a 1:4 mixture of ethyl ether and petroleum ether was added until crystals began to precipitate. The solution was warmed until complete solution was obtained and then cooled to −20° C. A yield of 0.29 g. of the complex of di-t. amyl hydroquinone and 2,6-trans,trans vitamin A aldehyde was obtained in the form of bright red crystals having $$E^{1\%}_{1\,cm.}\,(381\ m\mu) = 803$$

*Example 2*

Two tenths of a gram of 2,6-trans,trans vitamin A aldehyde was reacted with 0.087 g. of p-methoxy phenol as in the preceding example. The complex which was obtained as bright yellow crystals weighed 0.1 g. and had $$E^{1\%}_{1\,cm.}\,(381\ m\mu) = 1184$$

*Example 3*

A 0.2 g. sample of 2,6-trans,trans vitamin A aldehyde was treated with 0.0437 g. of toluhydroquinone according to the process described in Example 1. The trans,trans aldehyde-toluhydroquinone complex obtained thereby was in the form of yellow-orange crystals having $$E^{1\%}_{1\,cm.}\,(380\ m\mu) = 1141$$

An attempt to form a similar complex with 2,3-dimethyl hydroquinone resulted in no crystallizable complex.

*Example 4*

A 0.2 g. sample of 2,6-trans,trans vitamin A aldehyde was treated with 0.156 g. of iso-octyl hydroquinone by the method of Example 1. The complex was obtained in the form of orange crystals having $$E^{1\%}_{1\,cm.}\,(381\ m\mu) = 854$$

*Example 5*

A 0.2 g. sample of 2,6-trans,trans vitamin A aldehyde was treated with 0.0965 g. of p-dimethylamino phenol by the method of Example 1. A complex was obtained in the form of orange-tan crystals having $$E^{1\%}_{1\,cm.}\,(381\ m\mu) = 1181$$

A similar sample of 2-cis-6-trans vitamin A aldehyde gave no crystallizable complex.

*Example 6*

A 0.2 g. portion of 2,6-trans,trans vitamin A aldehyde was areated with 0.102 g. of chlorohydroquinone. The complex was obtained in the form of bright red crystals having $$E^{1\%}_{1\,cm.}\,(380\ m\mu) = 795$$

An attempt to substitute tetrachloro-hydroquinone for the monochloro-hydroquinone gave no crystallizable complex.

Similar results are obtained with other complexing materials as described hereinabove when reacted with 2,6-trans,trans pentaenals having the vitamin A aldehyde carbon skeleton. Since the cis forms of vitamin A aldehyde do not form crystallizable complexes in accordance with this invention, the 2,6-trans,trans complexes are readily separated from impure mixtures of the trans,trans aldehydes with cis isomers thereof, and pure trans,trans vitamin A aldehyde is readily obtained by washing the complexing material out of the crystalline complex product with aqueous alkali.

Although the invention has been described in considerable detail with reference to certain preferred embodiments thereof, it will be understood that variations and modifications can be effected within the spirit and scope of the invention as described hereinabove and as defined in the appended claims.

We claim:

1. As a new chemical compound, a crystallizable complex of a trans,trans pentaene aldehyde having the carbon skeleton and chemical composition of vitamin A aldehyde with a compound of the formula

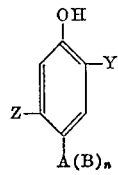

wherein A is selected from the group consisting of oxygen and nitrogen, B is selected from the group consisting of hydrogen and alkyl groups, $n$ is an integer equal to one less than the valence of A but not greater than two, and Y and Z are members selected from the group consisting of hydrogen atoms, halogen atoms and alkyl groups, at least one of B, Y and Z being other than a hydrogen atom, said complex being prepared in accordance with the method of claim 14.

2. As a new chemical compound, a crystallizable complex of equimolar proportions of a 2,6-trans,trans pentaenal of the formula

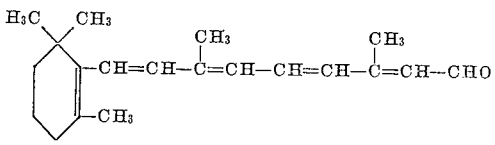

with a compound of the formula

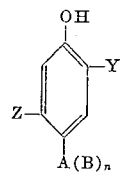

wherein A is selected from the group consisting of oxygen and nitrogen, B is selected from the group consisting of hydrogen and alkyl groups, $n$ is an integer equal to one less than the valance of A but not greater than two, and Y and Z are members selected from the group consisting of hydrogen atoms, halogen atoms and alkyl groups, at least one of B, Y and Z being other than a hydrogen atom.

3. As a new chemical compound, a crystallizable complex obtained by reacting equimolar proportions of a 2,6-trans,trans pentaenal of the formula

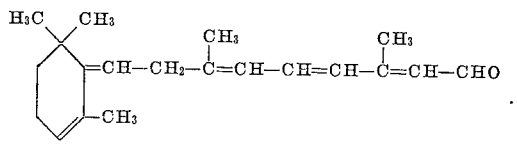

with a compound of the formula

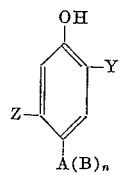

wherein A is selected from the group consisting of oxygen and nitrogen, B is selected from the group consisting of hydrogen and alkyl groups, $n$ is an integer equal to one less than the valence of A but not greater than two, and Y and Z are members selected from the group consisting of hydrogen atoms, halogen atoms and alkyl groups, at least one of B, Y and Z being other than a hydrogen atom.

4. As a new chemical compound, a crystallizable complex of a 2,6-trans,trans pentaene aldehyde having the carbon skeleton and chemical composition of vitamin A aldehyde with a monoalkyl hydroquinone, and being obtained by reacting equimolar proportions of said aldehyde and said monoalkyl hydroquinone.

5. As a new chemical compound, a crystallizable complex of equimolar proportions of a 2,6-trans,trans pentaene aldehyde having the carbon skeleton and chemical composition of vitamin A aldehyde with a monohalohydroquinone.

6. As a new chemical compound, a crystallizable complex of equimolar proportions of a 2,6-trans,trans pentaene aldehyde having the carbon skeleton and chemical composition of vitamin A aldehyde with a 2,5-dialkyl hydroquinone.

7. As a new chemical compound, a crystallizable complex of equimolar proportions of a 2,6-trans,trans pentaene aldehyde having the carbon skeleton and chemical composition of vitamin A aldehyde with a p-alkoxy phenol.

8. As a new chemical compound, a crystallizable complex of equimolar proportions of a 2,6-trans,trans pentaene aldehyde having the carbon skeleton and chemical composition of vitamin A aldehyde with a p-dialkylamino phenol.

9. As a new chemical compound, a crystallizable complex of 2,6-trans,trans vitamin A aldehyde with 2-methyl hydroquinone.

10. As a new chemical compound, a crystallizable complex of 2,6-trans,trans vitamin A aldehyde with 2-chlorohydroquinone.

11. As a new chemical compound, a crystallizable complex of 2,6-trans,trans vitamin A aldehyde with 2,5-di-tert. amyl hydroquinone.

12. As a new chemical compound, a crystallizable complex of 2,6-trans,trans vitamin A aldehyde with p-methoxy phenol.

13. As a new chemical compound, a crystallizable complex of 2,6-trans,trans vitamin A aldehyde with p-dimethylamino phenol.

14. The method which comprises admixing a compound of the formula

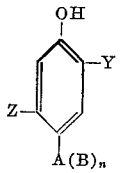

wherein A is selected from the group consisting of oxygen and nitrogen, B is selected from the group consisting of hydrogen and alkyl groups, $n$ is an integer equal to one less than the valence of A but not greater than two and Y and Z are members selected from the group consisting of hydrogen atoms, halogen atoms and alkyl groups, at least one of B, Y and Z being other than a hydrogen atom, with a mixture containing a trans,trans pentaenal having the carbon skeleton and chemical composition of vitamin A aldehyde and thereby forming a crystallizable complex of said material and said pentaenal, and separating said complex from said mixture.

15. The method which comprises admixing a monoalkyl hydroquinone with a mixture containing 2,6-trans,trans vitamin A aldehyde admixed with a cis form of said aldehyde and thereby selectively forming a crystallizable complex of said 2,6-trans,trans vitamin A aldehyde and said monoalkyl hydroquinone, and separating said complex from said mixture.

16. The method which comprises mixing together a monohalohydroquinone and a mixture containing 2,6-trans,trans vitamin A aldehyde admixed with a cis form of said aldehyde and thereby selectively forming a crystallizable complex of said 2,6-trans,trans vitamin A aldehyde and said monohalohydroquinone, and separating said complex from said mixture.

17. The method which comprises mixing together a 2,5-dialkyl hydroquinone and a mixture containing 2,6-trans,trans vitamin A aldehyde admixed with a cis form of said aldehyde and thereby selectively forming a crystallizable complex of said 2,6-trans,trans vitamin A aldehyde and said 2,5-dialkyl hydroquinone, and separating said complex from said mixture.

18. The method which comprises mixing together a p-alkoxy phenol and a mixture containing 2,6-trans,trans vitamin A aldehyde admixed with a cis form of said aldehyde and thereby selectively forming a crystallizable complex of said 2,6-trans,trans vitamin A aldehyde and said p-alkoxy phenol, and separating said complex from said mixture.

19. The method which comprises mixing together a p-dialkylamino phenol and a mixture containing 2,6-trans,trans vitamin A aldehyde admixed with a cis form of said aldehyde and thereby selectively forming a crystallizable complex of said 2,6-trans,trans vitamin A aldehyde and said p-dialkylamino phenol, and separating said complex from said mixture.

References Cited in the file of this patent

UNITED STATES PATENTS

| Number | Name | Date |
|---|---|---|
| 2,586,305 | Copenhaver | Feb. 19, 1952 |
| 2,586,306 | Copenhaver | Feb. 19, 1952 |